Feb. 6, 1951 R. W. DEIMLER 2,540,716
BOBBER HOOK
Filed Aug. 4, 1945
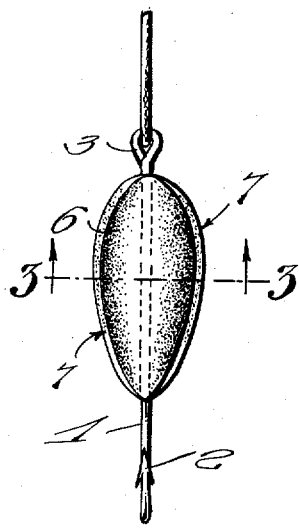
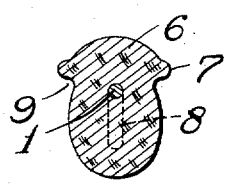
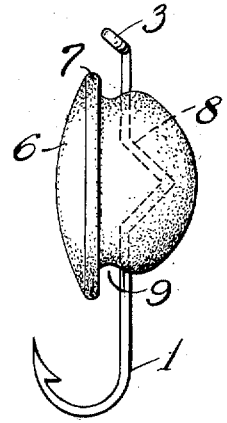
Inventor
RALPH WILLIAM DEIMLER,
By Jacoki & Jacoki
Attorneys Patented Feb. 6, 1951

2,540,716

UNITED STATES PATENT OFFICE 2,540,716

BOBBER HOOK

Ralph W. Deimler, Topeka, Kans.

Application August 4, 1945, Serial No. 608,906

4 Claims. (Cl. 43—42.37)

It is a basic object of this invention to provide a bobber fishing hook for anglers or fishermen, comprising a hook having a float fastened on its shank whereby the combined weight of the hook and float is of less specific gravity than water and the center of gravity is preferably offset away from the barb of the hook.

It is also an object of this invention to make a hook having a bent shank portion and to mold the float on the bent portion of the shank.

It is an object of this invention to produce a float stock material or substance having a moldable quality including a waterproof binder such as a vinyl resin adhesive combined with ground or comminuted cork or other suitable material.

It is also an object of this invention to provide the molded float with a rib, flange or fin extending about its major dimensions and defining a plane parallel to the major axis of the float and substantially at right angles to a plane defined by the bent portion of the shank of the hook and also substantially at right angles to the plane defined by the barbed portion of the hook.

It is a basic object of this invention to produce a bobber hook having its center of gravity located remote from the barb portion so that the barbed hook portion may be maintained in an upwardly projecting position so that a striking fish may be more readily hooked and caught.

While I have mentioned vinyl resin adhesive as a binder, I am aware of the fact that other suitable resin adhesives or binders may be used such as: phenol and urea formaldehyde resins. These resin adhesives are partly polymerized products which when completely polymerized harden to infusible, water-insoluble products. Of course, it is contemplated so far as the basic features of this invention are concerned, any suitable adhesive binder or bonding material may be used.

The accompanying drawing forms a part of the specification and is merely illustrative of my novel bobber hook and therefore changes in detail may be resorted to without departing from the basic features of the invention disclosed.

In the drawings—

Figure 1 is a plan view showing the relation of the fin with reference to the barbed portion and the eyelet on the shank of the hook.

Figure 2 is a side elevation of the bobber hook in which the center of gravity is indicated as being remote from the barb of the hook, and Figure 3 is a transverse sectional view of my bobber hook taken on the line 3—3 of Figure 1 looking in the direction of the arrows.

Like reference characters as used in the description and drawing refer to the details of the construction disclosed.

The bent portion of the shank 1 forms an anchor for the float 6 to prevent the float from rotating or slipping in any direction about or along the shank of the hook.

The float 6 is provided with a flange, rib or fin 7 on each of its sides.

When this bobber hook is in use, for example trolling, it scoots along on the water being supported on the surface of the water by the float and its fins. When a live bait, such as a minnow, frog or grass hopper is used, and the live bait wriggles about then the fins 7 cause ripples on the surface of the water which aids greatly in attracting the fish especially game fish such as trout, black bass, bluefish, striped bass, pike, pickerel, maskinonge (muskellunge), etc. A submerged lure or baited hook cannot make ripples on the surface of the water.

In making the float of Figures 1 to 3 inclusive a mass of comminuted or ground cork or other suitable material mixed with a binder such as vinyl resin adhesive is used. When the mixture is made and ready for use it is molded on the shank of the fishing hook by the use of suitable molding apparatus (not shown) including the application of heat and pressure which binds the material together and forms on the surface of the float a smooth waterproof finish.

A bright red pigment could be added, as by brushing it on as in painting, if desired. Other pigments could be chosen such as bright yellow, or a silverlike finish may be desired. The pigment finish or silverlike finish may be applied to the mold initially and then the float material may be added and the contents of the mold heat treated under pressure to secure the float on the bent shank.

The vinyl resin adhesive is thermo-plastic but not thermo-setting. If a thermo-setting binder is desired phenol or urea formaldehyde resin adhesives may be used.

In the trolling operation the float and hook unit moves along on the surface of the water with the barbed portion of the hook extending upwardly which is the most effective position to hook a striking fish. The bait on the barbed portion of the hook will trail along on the surface of the water and when the game fish strikes, its wide open mouth, takes in both the bait and the barbed portion of the hook and snags itself on the barbed hook portion.

The mechanic skilled in the art of molding is at liberty to select the most feasible method of assembling and molding the float on the shank of the hook.

In making the bend or bends in the shank of the fishing hook it is of importance that a mechanical balance shall be maintained between the eyelet end of the shank and the barbed hook end of the shank.

The float is of streamline contour defining a substantially ovate body which is located nearer to the eyelet than the barbed portion of the shank. Besides this general contour the float is provided with fins edges or ledges defining a plane substantially at right angles to the plane defined by the barbed hook portion. This is an important feature since it balances the bobber hook on the water with the barbed hook portion uppermost to effectively penetrate the mouth portion of a striking game fish.

The construction disclosed clearly displays the offset center of gravity of the bobber hook.

The molded float 6 is offset toward the barb portion 2 of the hook and thereby locates the center of gravity in the vicinity of the shank 1 of the hook. The shank 1 is provided with a V-shaped bend 8 to form an anchor for the float 6 molded thereon. The shank 1 is provided with an eyelet 3.

The larger portion of the float 6 is located remote from the center of gravity and suitably spaced from the pointed portion 2 of the hook. The large or upper portion of the float defines edges, ledges or fins 7 defining a plane substantially parallel to the major portion of shank 1 and substantially at right angles to the plane defined by the barb portion 2 of the hook. The large or upper portion of the float 6 has a peripheral edge extending outwardly beyond the major portion of the small portion of the float and defines a shallow groove 9 between the large and small portions thereof.

It is pointed out in this connection that the construction rights itself in the water and maintains the barb portion 2 of the hook uppermost. Besides righting itself, it prevents twisting or untwisting of the fishing line which is secured to the eyelet 3.

While I have described hereabove a float which is molded to the shank of the hook, it will be understood that I do not wish to be limited to such molding of the elements together. It is contemplated that the float may be made of solid cork or similar material cut in half longitudinally with the shank of the hook fitted therebetween in grooves and the two sections of the float adhesively secured together and to the shank, thereby retaining the hook in place relative to the float.

Having disclosed the basic principles of my unique invention, what I claim is:

1. The combination of a float and a hook wherein the float has a large portion and a small portion and both portions being oval in longitudinal section, said hook having a shank provided with an intermediate offset portion, an eye and a barbed portion, the intermediate portion being embedded in the small portion of the float, and in a plane including the barb portion and shank, said offset portion of the hook being at right angles to a plane defined by the intersection of the large and small portions of the float, the large portion having its peripheral edge extending outwardly from and beyond the surface of the small portion and defining a shallow groove between the large portion and the small portion of the float.

2. A floatable bobber fishing hook, said hook comprising an eyelet, a shank portion, a barbed portion, and a float, said shank portion having a bent portion constituting an anchoring means engaging the interior of the float and being embedded therein, said float comprising a solid body of compressed comminuted cork including a binder of waterproof adhesive material, said float being also coated with waterproof adhesive material, said float also comprising a substantially ovate body, said body being located nearer said eyelet than said barbed portion, said float having an upper portion offset toward the barbed portion of the hook, said barbed portion being offset from the major axis of the float, said float being provided on its opposite sides with fins located substantially in a common plane, said plane being located at substantially a right angle to the plane defined by the barbed portion of the hook, said fins being integral with said float and extending substantially throughout the whole length of said float, the major portion of each fin being substantially of uniform width and thickness, respectively, whereby a wriggling of the floating bobber hook by a live bait thereon will cause ripples on the surface of the water emanating from said fins.

3. A floatable bobber fishing hook, said hook comprising a shank, an eyelet, a barbed portion, and a float, said shank having a bent portion constituting an anchor engaging the interior of said float and being embedded therein, said float comprising a substantially ovate solid body of comminuted cork including a waterproof adhesive binder, said body having a coating of waterproof adhesive material, said float having an upper portion offset toward the barbed portion, said body being located nearer said eyelet than said barbed portion, said float having fins along the sides thereof in substantially a common plane located in an offset position toward the barbed portion of the hook but substantially parallel to the major portion of the shank and at substantially a right angle to the plane defined by the barbed portion of the hook, said float being longitudinally streamlined and being longitudinally unobstructed by any lateral projections, said fins being integral with said float and extending substantially throughout the full length thereof, the major portion of each fin being of substantially uniform width and thickness, respectively, whereby a wriggling of the floating bobber hook by a live bait thereon will cause ripples on the surface of the water emanating from said fins.

4. A floating bobber fishing hook, comprising a shank having an eyelet on one end thereof and a barbed portion on its opposite end, a solid float body, said shank having an anchor thereon embedded in said float, said float constituting a substantially ovate body, said body being located nearer said eyelet than said barbed portion, said body having fins on the sides thereof located substantially in a common plane at substantially a right angle to the plane defined by the barbed portion of the hook, said float being longitudinally streamlined and being longitudinally unobstructed by any lateral projections, said fins being integral with said float and extending substantially throughout the full length thereof, the major portion of each fin being of substantially uniform width and thickness, respectively, said barbed portion being offset from the major axis of the float, said solid float body having an upper portion offset from the shank toward the side of the hook carrying the barbed portion whereby the center of gravity of said floating bobber hook is located remote from said barbed portion and thereby maintaining the barbed portion in an upright position with the penetrating point of the hook uppermost.

RALPH W. DEIMLER.

REFERENCES CITED

The following references are of record in the file of this patent:

UNITED STATES PATENTS

| Number | Name | Date |
|---|---|---|
| 779,083 | Jamison | Jan. 3, 1905 |
| 903,333 | Slocum | Nov. 10, 1908 |
| 1,604,027 | Dills | Oct. 19, 1926 |
| 1,865,120 | Little | June 28, 1932 |
| 1,876,342 | Pelkinpaugh | Sept. 6, 1932 |
| 1,884,053 | McGarraugh | Oct. 25, 1932 |
| 1,994,692 | Davenport | Mar. 19, 1935 |
| 2,235,331 | Pugh | Mar. 18, 1941 |
| 2,307,200 | Cullerton | Jan. 5, 1943 |